United States Patent [19]
Chalaust

[11] 3,920,847
[45] Nov. 18, 1975

[54] COMPOSITION FOR MEDICAL, VETERINARY OF COSMETOLOGICAL USE CONTAINING A DIETHYL PYROCARBONATE

[76] Inventor: René Bernard Albert Chalaust, 22, rue de Saint Germain, Port Marly, Yvelines, France

[22] Filed: Feb. 13, 1973

[21] Appl. No.: 332,171

[30] Foreign Application Priority Data
Feb. 17, 1972 France............................ 72.005365

[52] U.S. Cl................................. 424/301; 260/463
[51] Int. Cl.²........................................ A61K 31/265
[58] Field of Search.................................... 424/301

[56] References Cited
OTHER PUBLICATIONS

Raikher et al. – Chem. Abst. Vol. 71, (1969) p. 120832K.
Shibasaki et al. – Chem. Abst. Vol. 73, (1970) p. 91212S.
Keeping Livestock Healthy (1942) pp. 519 and 520.
Martin–Remington's Practice of Pharmacy – 12th edition (1961) p. 409 & 418.

*Primary Examiner*—Stanley J. Friedman
*Attorney, Agent, or Firm*—Fleit & Jacobson

[57] ABSTRACT

A composition for therapeutic use in human and veterinary medicine, usable for fighting infectious states such as mastitis and for facilitating cicatrization, the active principle of said composition being diethyl pyrocarbonate having the formula:

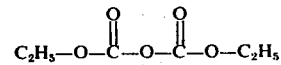

in a dilution of 1 to 5% by volume in an anhydrous aprotonic substance comprising no hydroxyl group, in a solvent, support of excipient, such as a hydrocarbon, vegetable or animal oils or greases, natural or synthetic waxes.

5 Claims, No Drawings

COMPOSITION FOR MEDICAL, VETERINARY OF COSMETOLOGICAL USE CONTAINING A DIETHYL PYROCARBONATE

The present invention relates to compositions for therapeutic use in human and veterinary medicine, which are useful in fighting infectious states such as mastitis, and for assisting cicatrization, the active principle of these compositions being diethyl pyrocarbonate, corresponding to the formula:

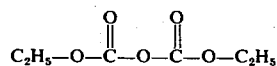

together with the method of preparation of these compositions.

The invention is also directed to the method of preparation of diethyl pyrocarbonate, as a substance capable of fighting infectious states such as mastitis and for assisting cicatrization, together with the use of this substance in the indications described above.

It is known that diethyl pyrocarbonate has bactericidal and fungicidal properties which have permitted the use of this substance for the sterilization in the cold state of alcoholic or other beverages, and the sterilization of dry particles of food products. However, this is the first time that diethyl pyrocarbonate has been indicated as usable in human and veterinary therapy.

More particularly as regards the cases of mastitis, it is well known that this can be treated quite effectively by means of antibiotics. However, this method of treating such infectious conditions has the major drawback of producing an undesirable effect on the quality of the milk, this becoming unsuitable for consumption and almost unusable for the manufacture of cheese.

The compositions of the present invention do not offer these drawbacks since they provide a very effective means of fighting these states of infection without leaving the slightest residuum injurious to health or prejudicial to the milk industry in general.

Diethyl pyrocarbonate is for this purpose preferably employed in dilution in proportions of approximately 1 % by volume with aprotonic anhydrous substances, solvents, supports or excipients such as petrolatum, liquid paraffim, vegetable or animal oils or grease, natural or synthetic waxes, and the final product may be in the form of aerosols, skin ointments, lotions, tablets, in syringes ready for use, or in tubes.

The preparation of diethyl pyrocarbonate is well known. In particular, it can be prepared by the methods described by BOEHM & MERTA in 1938 (Ber 71 – 1797), by reacting ethylcarbonate of an alkali metal on ethyl chlorocarbonate or on any other compound capable of producing this latter body in situ, for example by causing the reaction of two molecules of ethyl carbonate of an alkali metal on phosgene.

Although diethyl pyrocarbonate is an irritant in the pure state, its 1 % solution such as described in the examples below is no longer irritant but on the contrary is cicatrizing. During the course of these same tests, it has further been found that this compound has a strong deodorant action which is capable of making it valuable in cosmetology.

Its microbicidal action, amongst others against Bacterium Coli, Staphylococcus Aureus and on moulds, permits effective treatment of a large number of human and animal affections by virtue of the elimination of the irritant action.

An important application of the new product resides in the treatment of mastitis of various aetiologies, and also in the drying-up of milk cows, a treatment for which this product has revealed advantageous qualities which are much superior to those of conventional antibiotics.

EXAMPLE I

MASTITIS

Treatment with intramammary syringes of ointment having 1 % of diethyl pyrocarbonate.

1. Normandy cow - 4 years old, 3 months after calving. Mastitis of the right-hand rear quarter. Modification of homogeneity of the milk, with presence of curds - beginning of glandular inflammation. Quarter hot and painful; slight excess temperature, 39.4°; falling-off appetite towards the evening.

Action - One syringe injected after milking dry at night, and then the following morning and the following evening with subsequent massage so as to distribute the product in the acini. The following evening, the gland becomes relaxed and the appetite returns to normal. On the morning after, the milk regained its normal aspect and everything became satisfactory. No further treatment was carried out.

2. Normandy cow - 7 years old, 4 months after calving, Presence of muco-fibrinous lumpy accumulations in the milk. Right-hand rear udder distended and hot with the beginning of sclerous hardening; positive reaction to coloured indicator, milk highly acid, pH value less than 6.5. by fermentation of the lactose. Temperature 39.9°.

Complete milking and cure obtained in 3 days by the introduction of one syringe morning and night without any other treatment than the external use of an antimastitis ointment with a base of diethyl pyrocarbonate during massage.

EXAMPLE II

DRYING-UP OF MILK COWS with syringes if 1 % diethyl pyrocarbonate ointment:

1. Piebald cow - 5 years old, 8 months in calf with its third calf. Full milking. Introduction of one syringe into the four quarters of the udder. Milking stopped. Drying-up obtained normally without oedema reaction.

2. Normandy cows - 7 years and 10 years old: treatment obtained with one syringe in each quarter of the udder. Result in all respects comparable with that given by the use of commercial drying-up syringes with antibiotics.

EXAMPLE III

VETERINARY USES

The product, presented in the form of an ointment with 1 % by volume in a mixture of aliphatic hydrocarbons, liquid paraffins, petrolatum, was tested on various animals:

1. Male Alsatian dog 6/7 years old injured by a vehicle, a number of wounds of which one forms a pustule on the thigh, the second in the lower fibula-tibia region. Complete cleaning, daily injection for three days with 500,000 units of bi-penicillin and 0.500 gram of dihydro-streptomycin. Application twice a day for the first 4 days and then once a day for the next 8 days of the product of the invention. Rapid healing without suppuration, with absolutely normal cicatrization.

2. Female Malines sheep dog 1½ years old hurt in an accident, had a very large wound at the level of the right-hand cheek with an old deep detachment and suppuration with a beginning of untimely granulation which prevent closure by stitching. After cleaning and washing with elimination of the more or less necrosized and proliferous tissue, application of ointment and dressings renewed during the first 5 days. The wound was subsequently left open to air with a daily application of the product of the invention. Rapid recovery of the gangrenous tissues and filling-up from the interior towards the exterior in about 20 days without suppuration.

3. Male black hunting dog, 2 years old (Spaniel type). Wound at the rear level of the right-hand paw-joint, linear, probably cut with a piece of glass. Application of ointment with dressing renewed for 3 days, after which the wound was left open. Healed in 10 days without suppuration.

4. Sheep dog, black and tan, male, 4 years old. Large wound on the back with considerable muscular damage extending over a length of 9 cm. and a width of 4 cm. Healed up in about 12 days with application of the product of the invention only; recovery of the tissue without excessive granulation. The wound rapidly became sound and healthy with a pink colour.

5. Hunting dog, black and white, male, 4 years old. Radial sub-cranial fracture in the high position, with an open wound. Fenestrated plaster. Administration of 500,000 BIPENI (Bipenicillin + 500 DHS (dihydrostreptomycin) for 2 days; introduction of the product of the invention twice per day up to removal of the plaster 16 days later. The wound was clean and healthy, and while the healing was not complete, it is probable that the inflammation due to the plaster was the reason, since healing was completed after a few days application of the ointment.

6. Female grey griffon, 7 years old. Operation for a tumor of the breast of the size of a large pigeon's egg. Anesthesia with Imagen in intravenous injection. Wound covered with products before closing with stitches. After four days of dressings renewed each day with introduction of ointment above and below and advancing by light massage, perfect cicatrization was obtained without any suppuration, although the wound left open had remained in contact with a more or less clean bedding, changed only every morning. Stitches removed on the eleventh day, healing complete.

7. Black and white castrated cat, 5/6 years old. Deep wounds on the inside of the left-hand thigh, with slight suppuration which disappeared after a few days. Complete healing in 2 weeks, without incident.

COSMETOLOGY

Finally, in respect of the use of the product in cosmetology, one example is given below:

A rod is prepared, commonly known as a stick, by dissolving 1% of diethyl pyrocarbonate in cocoa butter. The daily use under the armpits has shown an effective and durable deodorant power, as could be expected, following the previous examples.

TOXICOLOGY

The toxicology of diethyl pyrocarbonate is known. The lethal dose 50 for mice, rats, rabbits and dogs per bone is situated between 500 and 1200 mg/kg body weight.

To sum-up, it is clear from the experimental data given above that the preparation according to the invention:

has proved to be neither caustic nor irritant and has never caused secondary reactions;

has shown a definite bactericidal and bacteriostatic action;

does not interfere with the life of tissular cells and facilitates their multiplication;

does not therefore cause any delay in the cicatrization of wounds but has a definite tendency to facilitate and accelerate healing;

avoids the problem of dressings, which is important in veterinary medicine; the wounds can be exposed to the open air and the animal medicine; the wounds can be exposed to the open air and the animal can lick itself without harm;

has a deodorant effect on infected wounds of a bad nature and smell.

I claim:

1. An ointment composition for topical administration in human and veterinary medicine for treating mastitis and facilitating cicatrization, said composition comprising diethyl pyrocarbonate having the formula:

diluted to 1 to 5% by volume in an anhydrous aprotonic substance having no hydroxy groups, in a solvent or excipient selected from the group consisting of aliphatic hydrocarbons, liquid paraffins, petrolatum, vegetable or animal oils, grease and natural or synthetic waxes.

2. A composition in accordance with claim 1, in which said diethyl pyrocarbonate is diluted to 1% by volume.

3. A method for topical administration in human and veterinary medicine for treating mastitis and facilitating cicatrization, said method comprising administering to an animal or human an effective, non-toxic amount of a composition comprising diethyl pyrocarbonate having the formula:

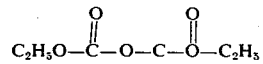

diluted to 1 to 5% by volume in an anhydrous aprotonic substance having no hydroxy groups, in a solvent or excipient selected from the group consisting of aliphatic hydrocarbons, liquid paraffins, petrolatum, vegetable or animal oils, grease, and natural or synthetic waxes.

4. The method of claim 3 in which said composition is administered to the mammary gland of a human.

5. The method of claim 3 in which said composition is administered to the mammary gland of an animal.

* * * * *

UNITED STATES PATENT OFFICE
CERTIFICATE OF CORRECTION

PATENT NO. : 3,920,847
DATED : November 18, 1975
INVENTOR(S) : Rene Bernard Albert Chalaust It is certified that error appears in the above-identified patent and that said Letters Patent are hereby corrected as shown below:

On the title page, under Foreign Application Priority Data, change "72.005365" to --72.05365--.

Signed and Sealed this ninth Day of March 1976

[SEAL]

Attest:

RUTH C. MASON
Attesting Officer

C. MARSHALL DANN
Commissioner of Patents and Trademarks